(12) United States Patent
Neveu

(10) Patent No.: US 6,863,323 B2
(45) Date of Patent: Mar. 8, 2005

(54) MODULAR GRIPPER

(75) Inventor: Dominique Neveu, Creron (FR)

(73) Assignee: AMG, Grossoeuvre (FR)

( * ) Notice: Subject to any disclaimer, the term of this patent is extended or adjusted under 35 U.S.C. 154(b) by 0 days.

(21) Appl. No.: 10/058,075

(22) Filed: Jan. 29, 2002

(65) Prior Publication Data

US 2003/0015881 A1 Jan. 23, 2003

Related U.S. Application Data

(63) Continuation-in-part of application No. PCT/FR00/01247, filed on May 2, 2000.

(30) Foreign Application Priority Data

Jul. 29, 1999 (FR) ............................................ 99 10003

(51) Int. Cl.[7] .............................. B25J 15/06; B66C 1/02
(52) U.S. Cl. ....................................... 294/65; 294/81.2
(58) Field of Search ........................ 294/64.1, 65, 81.2, 294/81.5, 81.6; 414/627, 737, 752.1; 901/40

(56) References Cited

U.S. PATENT DOCUMENTS

| | | | | |
|---|---|---|---|---|
| 3,102,751 A | * | 9/1963 | Noble et al. ................... | 294/65 |
| 3,223,442 A | * | 12/1965 | Fawdry et al. ............. | 294/64.1 |
| 4,129,328 A | * | 12/1978 | Littell .......................... | 294/65 |
| 4,685,714 A | * | 8/1987 | Hoke ......................... | 294/81.2 |
| 4,957,318 A | * | 9/1990 | Blatt .......................... | 294/64.1 |
| 5,135,276 A | * | 8/1992 | Blatt et al. ..................... | 294/65 |
| 5,152,566 A | | 10/1992 | Blatt et al. ................. | 294/81.2 |
| 5,688,008 A | * | 11/1997 | Hansch ...................... | 294/64.1 |
| 5,733,097 A | * | 3/1998 | Herbermann et al. ..... | 414/752.1 |

* cited by examiner

Primary Examiner—Dean J. Kramer
(74) Attorney, Agent, or Firm—Westerman, Hattori Daniels & Adrian LLP

(57) ABSTRACT

This gripper is designed to transport all types of materials, metal, cardboard, glass, plastic, wood in all types of industries. It is comprised of several types of profile sections, made of aluminum, for example, as well as several types of mechanical pieces made of a light metal alloy, which, by their shapes, can be mounted quickly and transport pieces of all shapes. This gripper consists of a central core and profile sections fitted to be affixed perpendicularly onto this central core, mechanisms to affix these profile sections at the desired position, and ball and socket bearings mounted to the ends of these profile sections. Air chokes are affixed to the ends of the ball joints, which make possible an angular clearance of the air chokes.

28 Claims, 16 Drawing Sheets

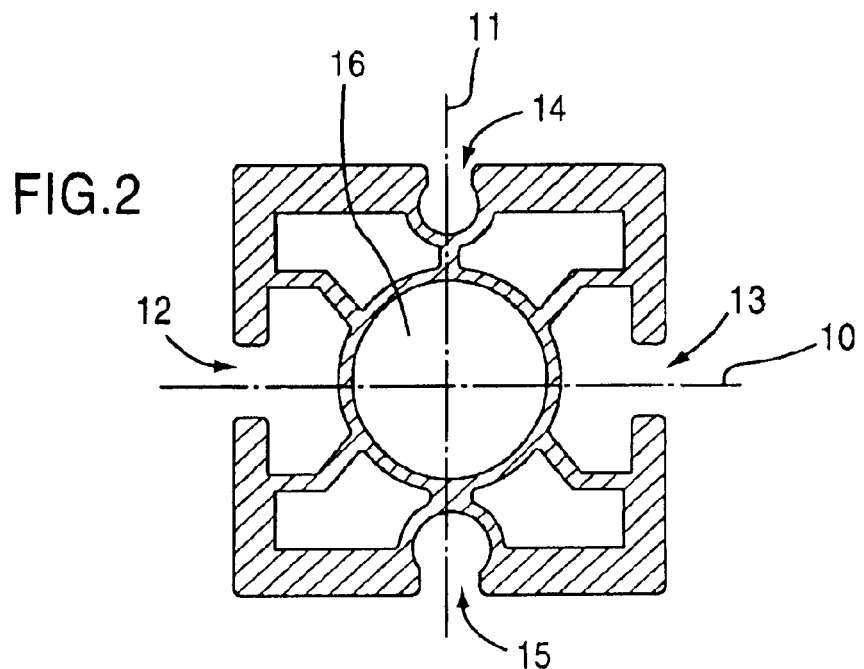
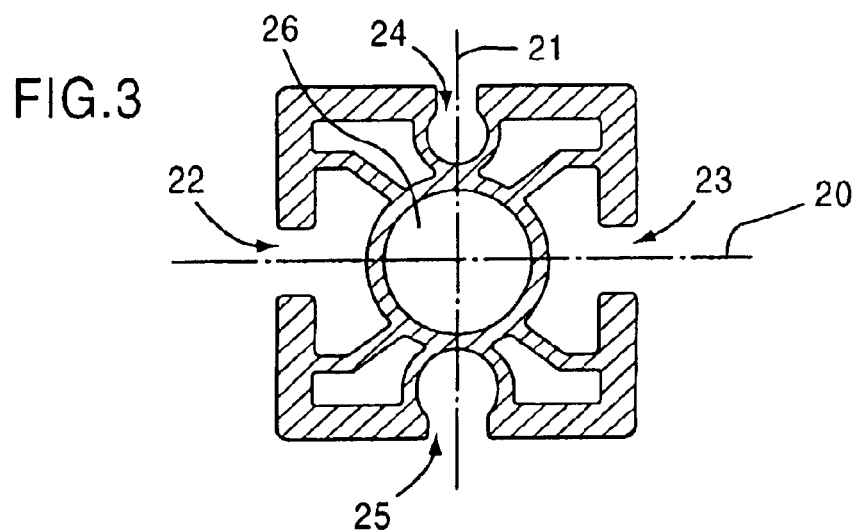
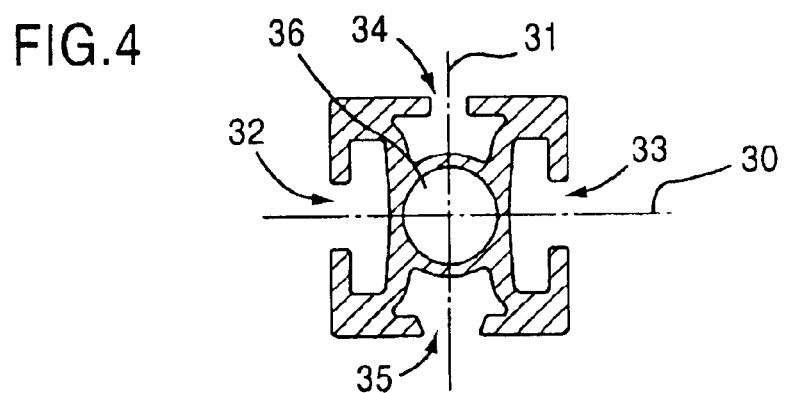

MODULAR GRIPPER

This application is a Continuation-in-Part of prior application Serial No. PCT/FR00/01247 filed May 2, 2000, which is hereby incorporated by reference, and which was not published English under PCT Article 21(2).

The object of the invention presented here is a gripper provided with air chokes using vacuum suction, capable of transporting various materials or objects, in particular, made of metal, cardboard, glass, wood in all types of industries.

RELATED ART

The manufacture of these grippers is generally performed in a non-industrial manner, differing according to the industrial environment, often out of welded steel tubes, always at the last minute, from a prototype of the piece to be transported, and designed by the maintenance departments of factories.

Grippers of this type are known, for example, from the patent FR-A 2 566 310 and from the patent EP 0 802 334. The standardization of these grippers is not a priority and is not the object of research as far as productivity is concerned.

SUMMARY OF THE INVENTION

The gripper intended by the invention has the purpose of correcting these disadvantages.

According to the invention, the gripper has a modular structure, which comprises a central profile section core whose dimension is fitted to the size of the piece to be transported, and of profile sections fitted in order to be affixed perpendicularly onto this central core, mechanisms for affixing these profile sections at the selected location, ball and socket bearings mounted at the ends of these profile sections, air chokes that are affixed to the ends of the ball joints and ball joints that enable an angular clearance of the air chokes.

Based on these characteristics, a prototype of the piece to be transported is no longer necessary, since the gripper can be designed from a digitized tape of the piece. The sizeable number of standard pieces makes it possible to assemble it in only about ten minutes by virtue of its modularity. In addition, adjustment can be done in three dimensions. In this way, it is possible to grip pieces having awkward and complex shapes.

According to the invention, the gripper may also include the following characteristics. The central core may be profiled in such a way so as to make it possible to laterally clamp suction pipes for the air chokes. The mechanisms for affixing the profile sections to the central core may consist, for each profile section, of an angle bracket and a small plate that allow the profile sections to become affixed to any position of the central core. Each air choke may be supported by a ball joint mounted in a ball and socket bearing, giving the assembly a specified clearance, for example, of 22 degrees, thus making it possible to transport pieces having awkward shapes. The air choke may be supported by a combined ball joint mounted in a ball and socket bearing, giving the assembly an angular clearance of 30 degrees, and having different lengths that serve as the extension pieces. The air choke may be supported by a piece in the shape of a ball joint whose axis is mounted with a spring, and which is mounted in a ball and socket bearing, giving the assembly an angular clearance of 22 degrees.

Further, the gripper may comprise a ball and socket bearing fitted in order to mount the ball joints there and of ball joints that are fitted with springs as well as combined ball joints, thus making possible an angular clearance of approximately +22 degrees in the two first cases, and of 30 degrees in the last case, where their attachment onto the corresponding profile section makes it possible to make the assembly slide until the desired position along the profile section, or extension pieces and combined ball joints that make it possible for the air chokes to be able to suction by vacuum the pieces whose shapes or differences in height are sizeable. The gripper may comprise sloped shims that make it possible to increase the angle by 15 degrees in one case and 35 degrees in a second case. The gripper may be fitted in order to be affixed onto a robot or on a mechanized system by means of a manual interface, in order to allow an effective clamping of the gripper with a large amount of rigidity, or it may be adapted in order to be affixed onto a robot or on a mechanized system by automatic interfaces with a large amount of clamping rigidity. The gripper may be mounted onto a crosspiece that is itself mounted either onto a robot or onto a mechanized system, and that accommodates three interfaces that make it possible to mount a gripper to the center for small pieces to be transported, or to each end for the pieces that have large dimensions.

BRIEF DESCRIPTION OF THE DRAWINGS

The invention will be described in reference to the attached drawings which show it in possible different embodiment modes.

FIGS. 2 and 3 are transverse section views of the profile sections that can constitute a central core of the gripper according to the invention.

FIG. 4 is a transverse section view of a profile section that can be attached perpendicularly to the central core of the gripper.

DESCRIPTION OF PARTICULAR EMBODIMENTS

Figure 1:
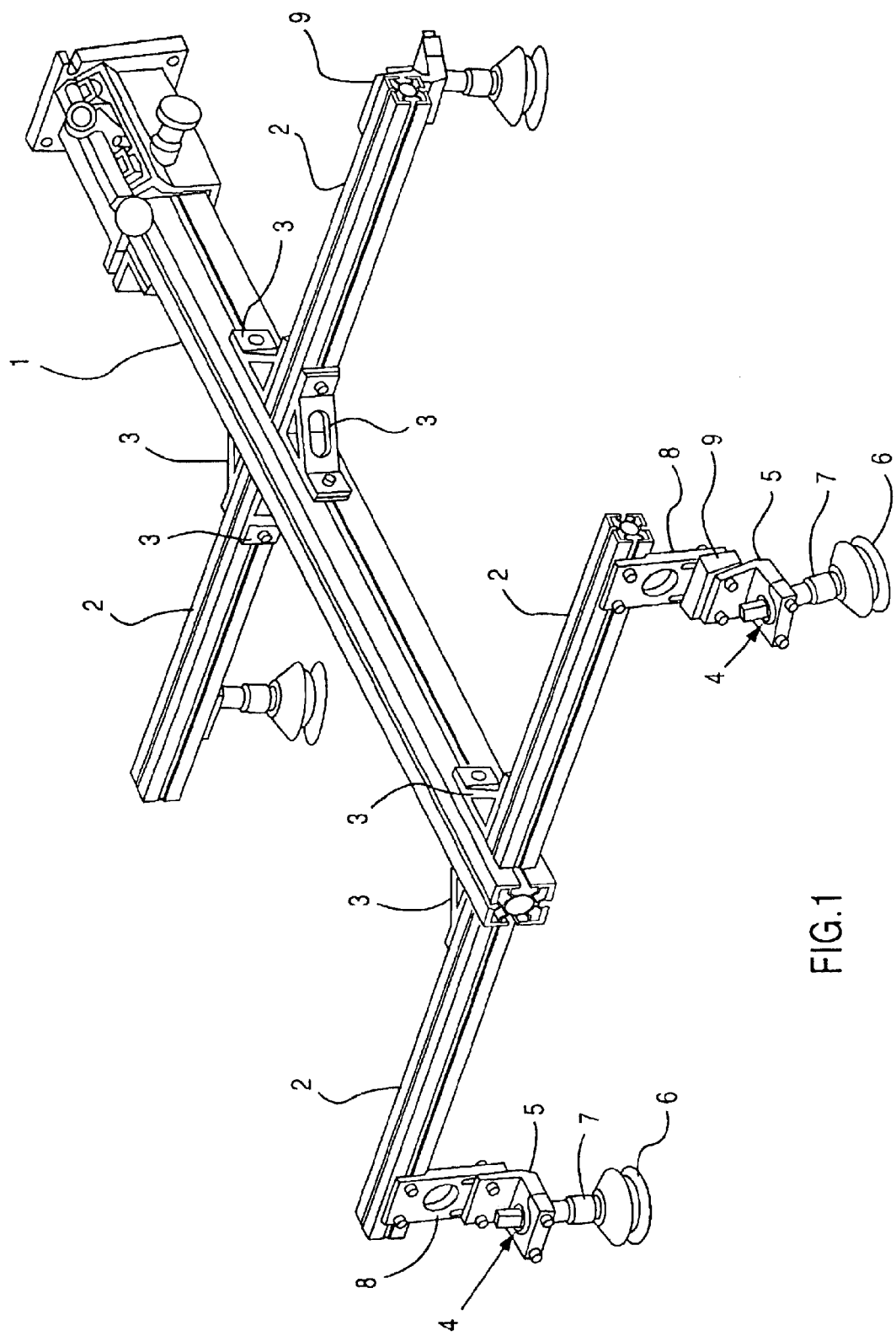
FIG. 1 is a perspective view of an embodiment form of a modular gripper according to the invention.

The gripper shown in the drawings is made of a modular structure, which includes a central profile section core 1 (FIG. 2 or 3) whose dimensions are fitted to the size of the piece to be transported, and of at least one profile section 2 (FIG. 4) fitted in order to be attached perpendicularly onto this central core 1.

As shown on FIG. 1, the central profile section core and the profile sections have cross-sections that remain substantially the same over their length.

As shown on FIGS. 2–4, the central profile section core and the profile sections each have two longitudinal planes of symmetry (respectively 10 and 11, 20 and 21, and 30 and 31), substantially perpendicular to each other, and comprises two opposed lateral grooves (respectively 12 and 13, 22 and 23, and 32 and 33) having openings oriented along one (respectively 10, 20, and 30) of these planes of symmetry and two additional opposed lateral grooves (respectively 14 and 15, 24 and 25, and 34 and 35) having openings oriented along the other (respectively 11, 21 and 31) of these planes of symmetry. As is visible in the Figures, each of the grooves has a maximum transverse width larger than a width of its opening.

The two lateral grooves 34, 35 of the profile section of FIG. 4 make it possible to clamp there, on each side, a pipe, for example, of the size 5.5×8. The same possibility exists for opposed lateral grooves 14, 15 and 24, 25 of the profile sections of FIGS. 2 and 3, whose geometry can be modified approximately in order to allow the grooves to clamp, for example, 5.5×8 pipes there from two sides. The other grooves are for attaching air chokes as described in details below.

As shown on FIG. 1, the gripper also includes mechanisms 3 for affixing these profile sections 2 at the selected locations, as well as ball and socket bearings 4 on supports 5 mounted on these profile sections 2 (see also FIG. 7 to 10), air chokes 6 that are affixed by air choke supports 7 to the ends of the ball joints (FIGS. 10, 15, and 18–20) that enable an angular clearance of the air chokes.

Figure 5:
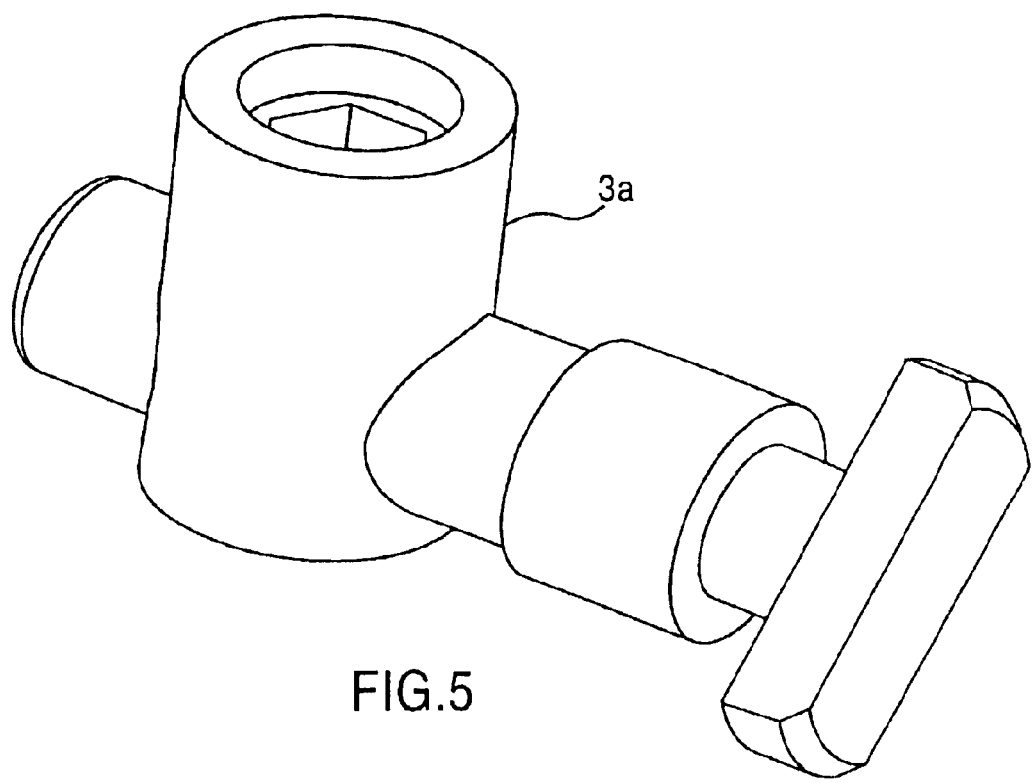
FIG. 5 is a perspective view of a joint for attachment of a profile section to the central core.
Figure 6:
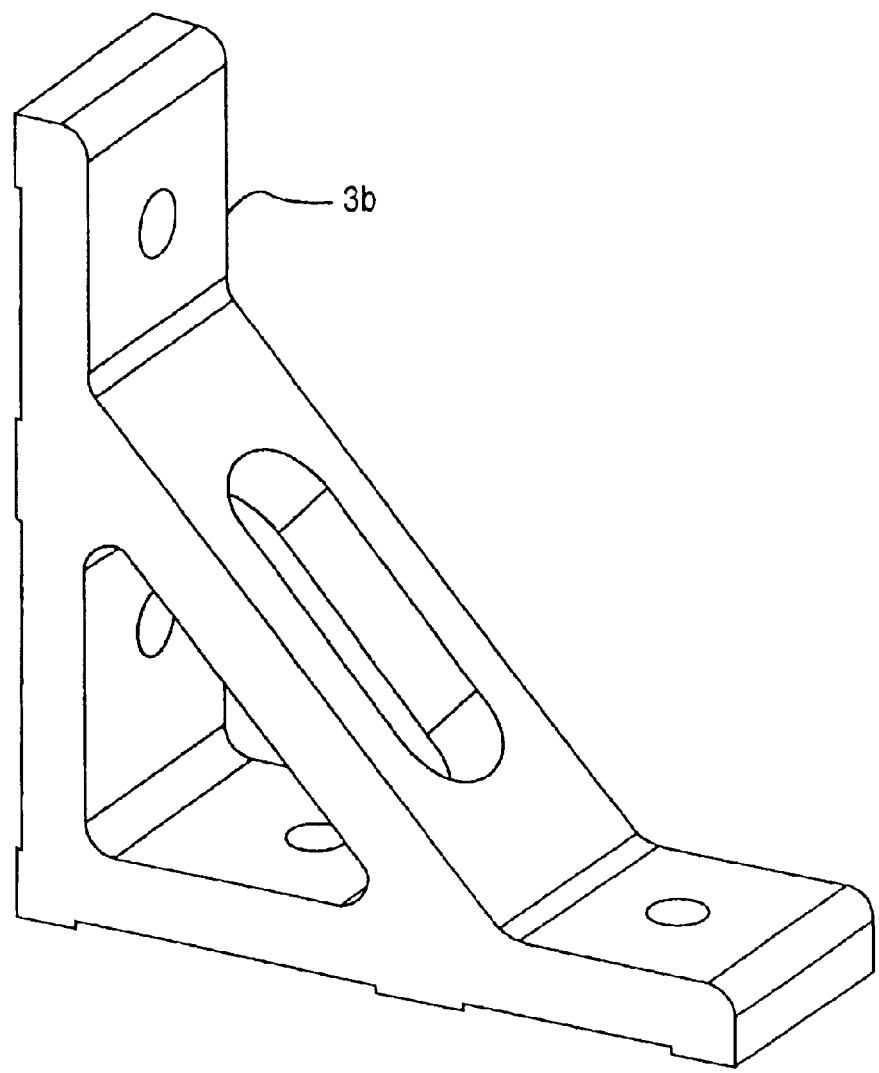
FIG. 6 is a perspective view of an angle bracket for attachment of a profile section to the central core.
Figure 7:
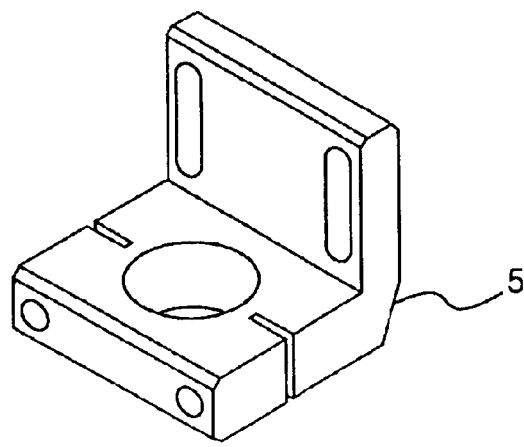
FIG. 7 is a perspective view of a ball and socket bearing support.
Figure 8:
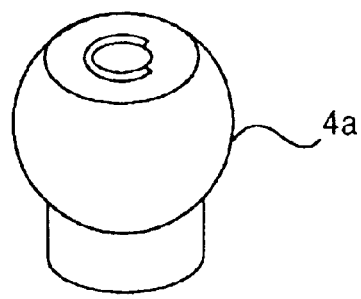
FIG. 8 is a perspective view of a ball joint.
Figure 9:
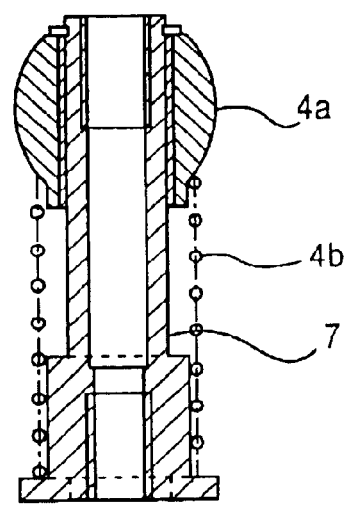
FIG. 9 is a longitudinal section view of a ball joint fitted with a spring according to a second embodiment mode.

The central core 1 can be made of aluminum. The attachment system 3 consists of a connection piece 3a (FIG. 5) and angle brackets 3b (FIG. 6); it makes it possible to easily adjust the different profile sections of FIG. 4 to the selected locations. The length of the profile sections of FIG. 4 is determined by the position of the air chokes 6 that, themselves, vary according to the geometry of the piece to be transported.

Figure 13:
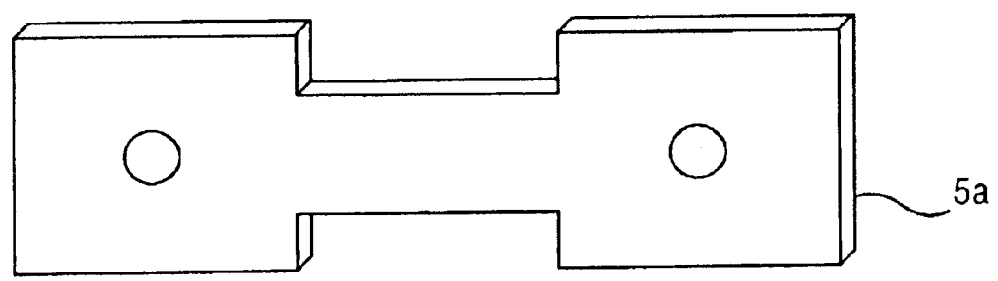
FIG. 13 shows a small plate.
Figure 16:
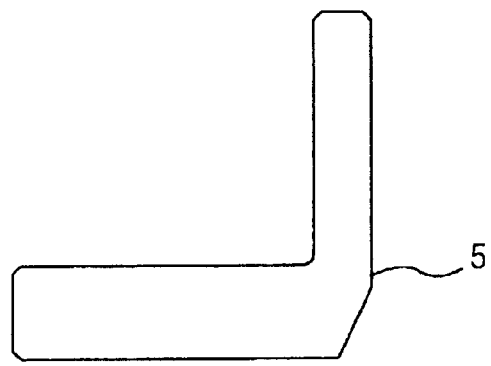
FIG. 16 is a front view of a flat angle mounting bracket.
Figure 15:
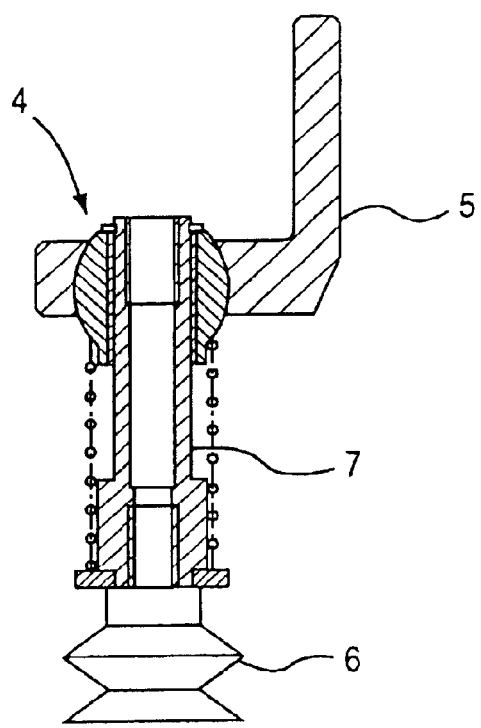
FIG. 15 is a sectional front view of a ball joint fitted with a spring, of its air choke and its bearing.
Figure 17:
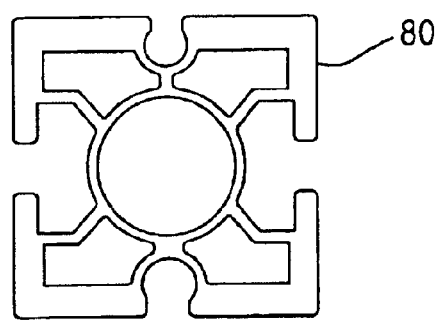
FIG. 17 is a transverse section view of another profile section core 80 of the gripper.

At the end of the profile sections of FIG. 4, ball and socket bearings 4 are affixed through ball and socket bearing supports 5 (FIG. 7) on which simple ball joints 4a (FIG. 8) or ball joints 4a fitted with springs 4b (FIG. 9) or combined ball joints are mounted as needed. The mounting of all of the elements is shown in FIGS. 10, 15, 18 and 20. The ball and socket bearing supports (FIG. 7) are affixed onto the profile section of FIG. 4 by cooperating with small plates 5a (FIG. 13) that slide inside of the grooves of the profile sections by means of bolts 5b (FIG. 18), and which make thus it possible to provide a supplemental adjustment.

Figure 18:
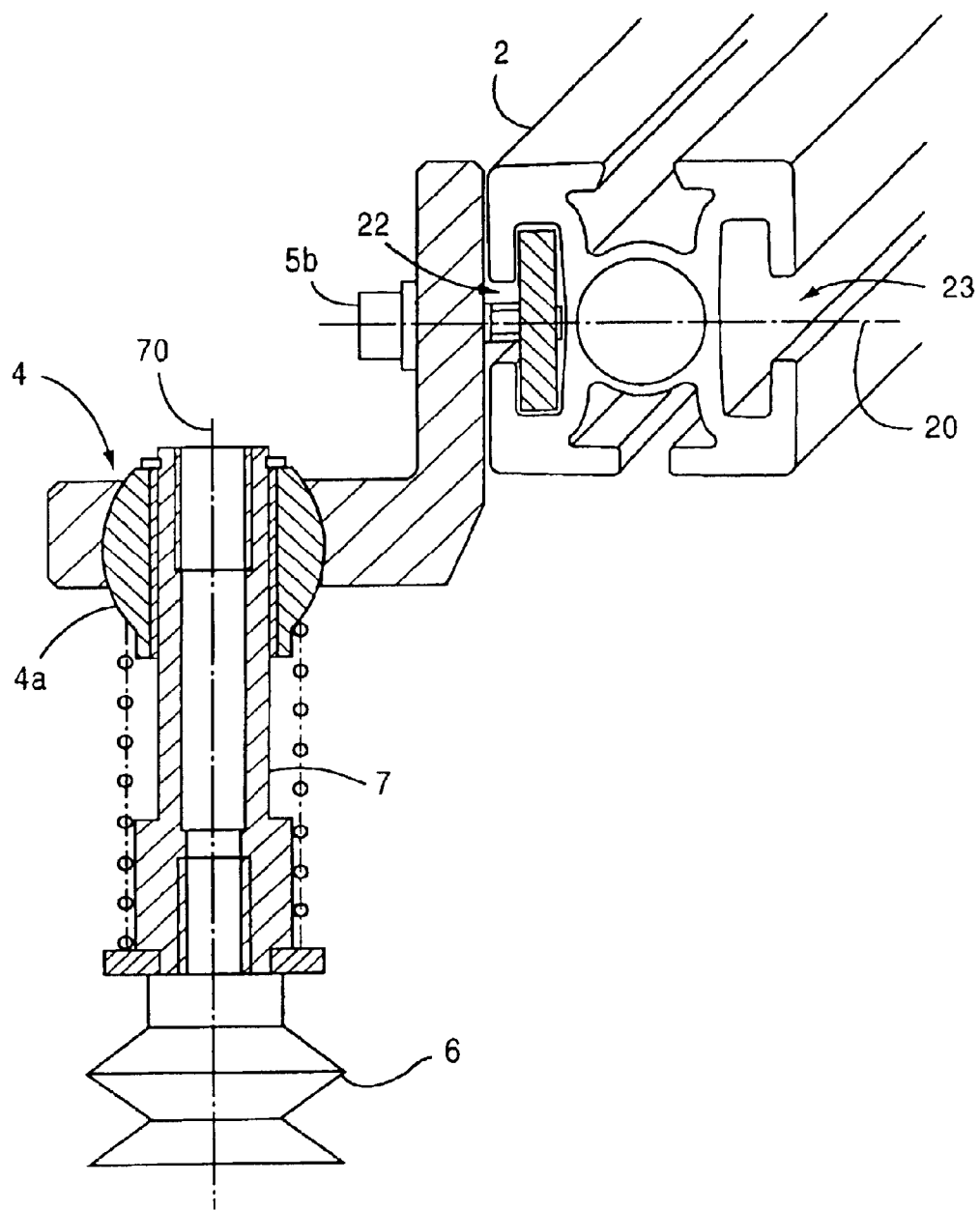
FIG. 18 is a perspective and partial section view of the profile section, of a ball and socket bearing, of a ball joint fitted with a spring, and the associated air choke.
Figure 19:
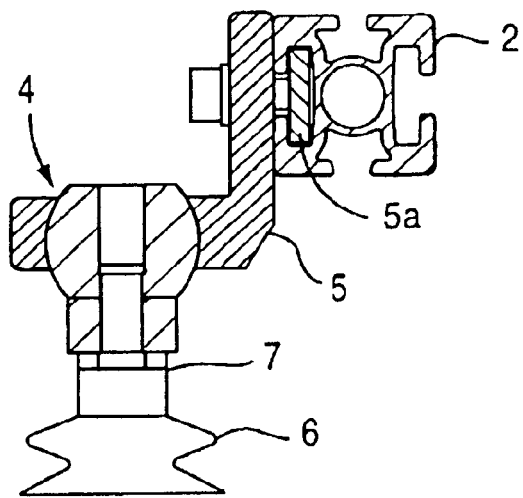
FIG. 19 is view similar to FIG. 18 according to another embodiment form of the ball joint.

As shown best in FIG. 18, the ball and socket bearing support 5 in the shape of an angle bracket extends away from the horizontal plane of symmetry 20 of the profile section 2, such that (i) the ball joint 4a on the ball and socket bearing 4 is placed away from the plane of symmetry 20 of the profile section and (ii) a main central axis 70 of the ball joint on the ball and socket bearing 4 is oriented away from the plane of symmetry 20 of the profile section. Also, it is visible on FIG. 18 that the ball and socket bearing support 5 is clamped to the profile section 2 independently from the ball joint 4a.

Figure 20:
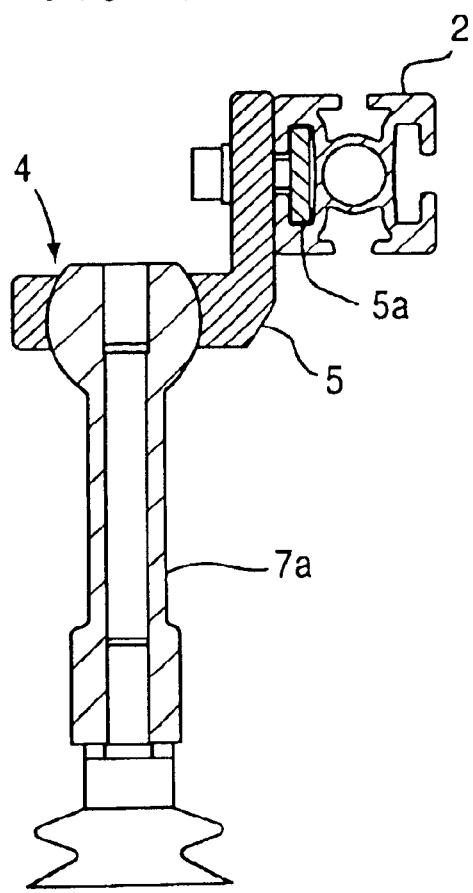
FIG. 20 is a front view similar to FIG. 19 showing another embodiment variation.
Figure 25:
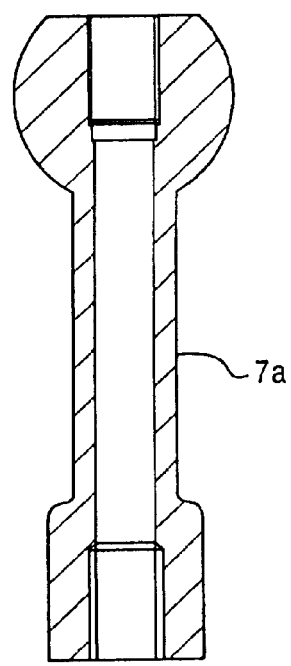
FIG. 25 is a front view of a ball joint combined with an extension piece.

The two different types of ball joints (FIGS. 8 and 9) make possible an angular clearance of approximately +22 degrees, which makes it possible to refine the final adjustment. The combined ball joints (FIG. 25) allow an angular clearance of approximately +30 degrees, and, depending on their length, act simultaneously as an extension 7a (FIGS. 20, 25). The different types of air chokes are chosen as a function of the space available on the piece to be transported and its weight. There are affixed to the end of the ball joints (FIGS. 10, 15 and 18–20).

Figure 11:
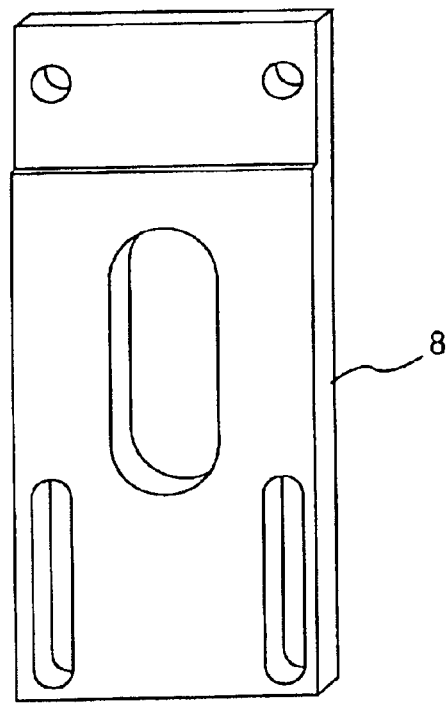
FIGS. 11 and 12 show an extension piece and a sloped shim, respectively.
Figure 12:
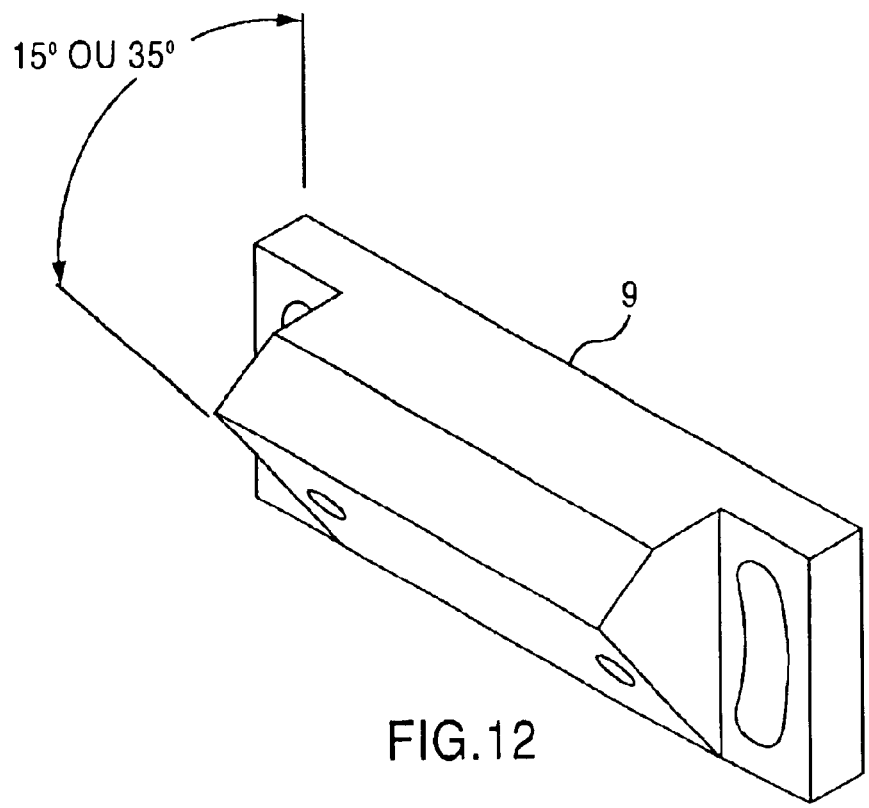

In case it is necessary to adjust the height, there are several types of extension pieces 8 (FIGS. 1, 11) or combined ball joints covering most of the necessary adjustments. In case of awkward pieces that require an angular clearance greater than the one obtained with the ball and socket bearings (FIG. 7) and the ball joints (FIG. 8, 9), as well as the combined ball joints, sloped shims 9 are planned (FIG. 1, 12) that make it possible to increase the angle by 15 degrees in one case and 35 degrees in the other case.

The assembly of all of these pieces makes it possible to construct a modular gripper that is capable of meeting all requirements. The specifically designed shapes of the profile sections, as well as the standard assembly of the pieces made of a light metal alloy, make it possible to obtain an assembly having a large amount of rigidity with a relatively low weight. On the three types of profile sections, shapes have been specifically designed in order to clamp two types of suction pipe, which produce a gain in assembly time, and which make it unnecessary to affix them with pipe-collars. All three have been designed in order to receive the small mounting plate (FIG. 13), which makes it possible to only keep in stock a single small plate reference item, and to obtain a good quality of clamping in the profile sections. The inside hole respectively 16, 26, 36 of the profile sections of FIGS. 2–4 is designed in a manner to be directly threaded in ISO pitches without the necessity for machining.

Figure 14:
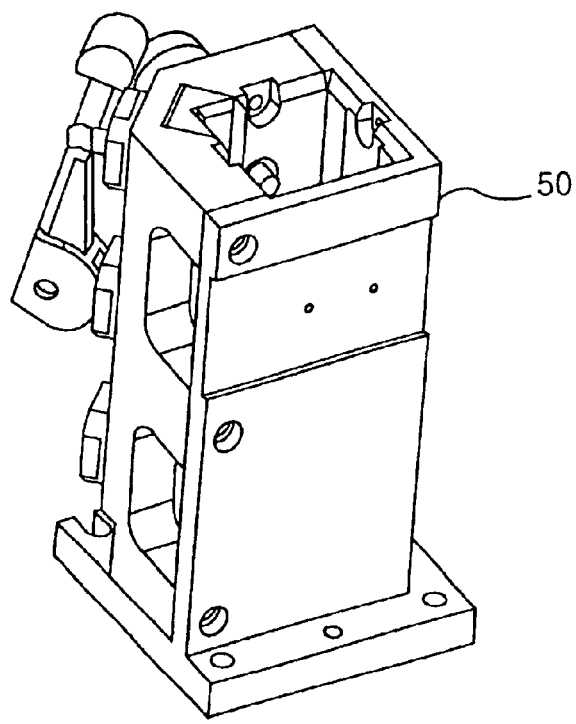
FIG. 14 is a perspective view of the manual interface between the gripper and a robot or mechanized system (not shown).
Figure 22:
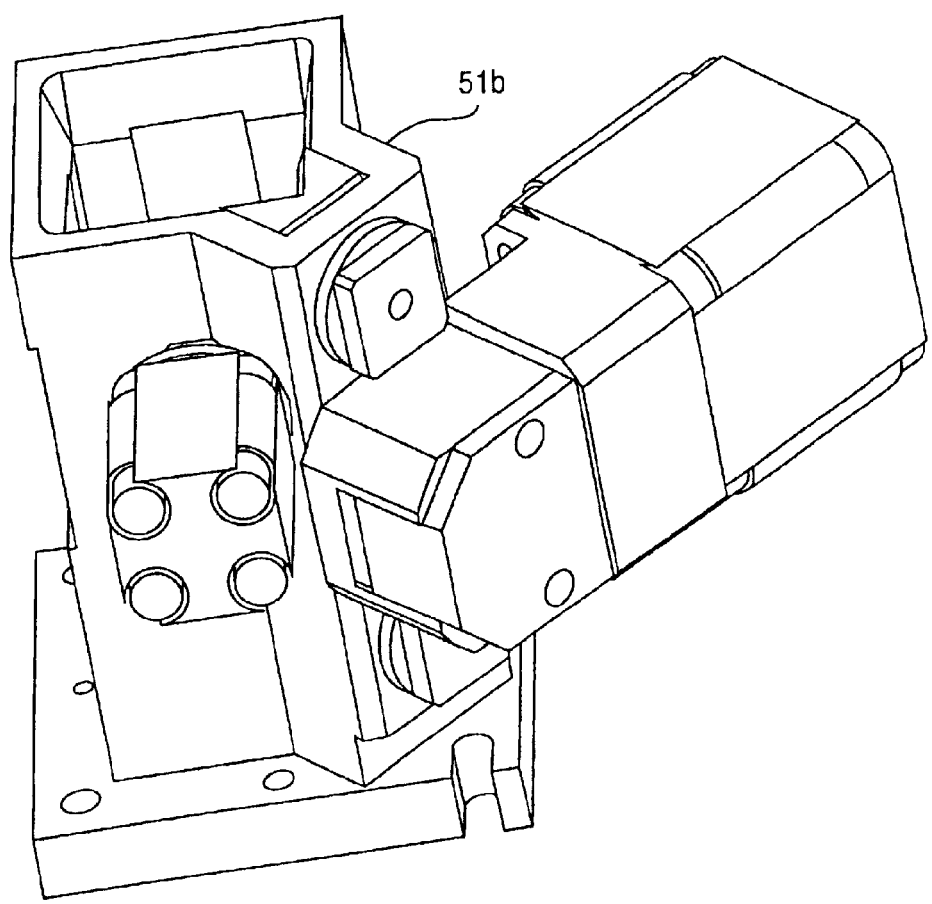
Figure 23:
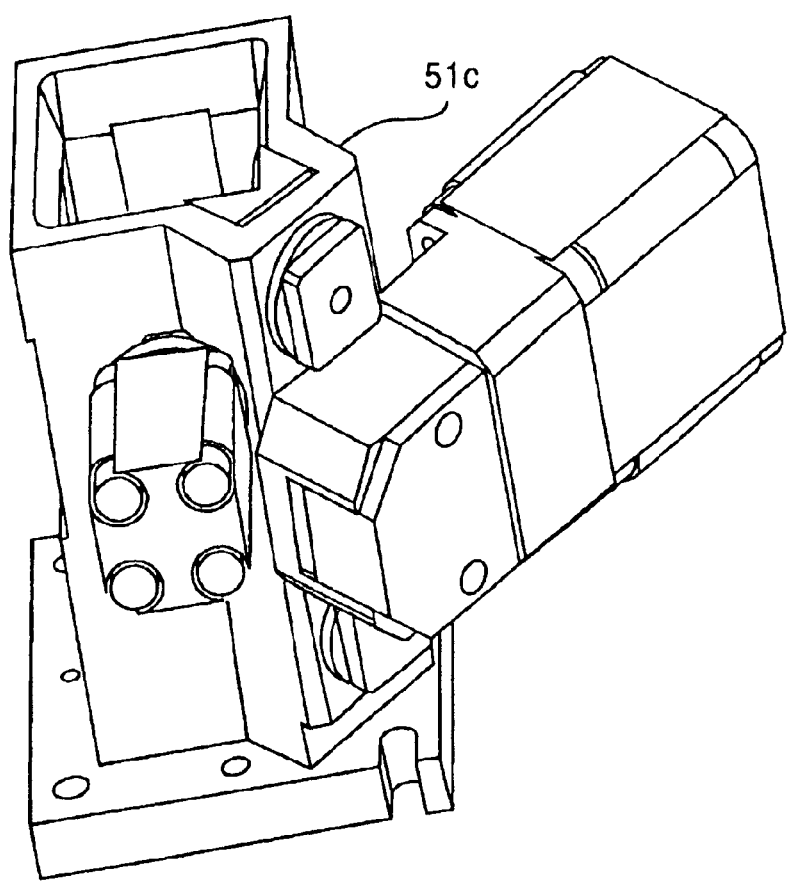

The modular gripper according to the invention can be affixed onto a robot or onto a mechanized system with the help of a manual interface 50 that is specially adapted for this purpose (FIG. 14) for the profile sections of FIGS. 2–4. It is also possible to make automatic interfaces 51a and 51b for the profile section of FIG. 2 (FIGS. 21–22), and 51c for the profile section of FIG. 3 (FIG. 23).

The interfaces, by virtue of their monostable clamping at a corner cam of the profile section, allow in all cases a large amount of clamping rigidity and a good repeatability of the positioning precision of the modular gripper.

The profile section made of aluminum in FIGS. 2–4 has a structure whose shapes have been specifically designed in order to obtain an especially low weight, all while preserving an especially good resistance to torsion and to deflection. Moreover, on two opposite sides of the profile section of FIG. 2, the diameter of the shapes and the width of the intake groove provide the possibility for clamping on one side, a 5.5×8 suction pipe, and on the other side, a 4×6 suction pipe.

In addition, on the two other sides, the shapes of the slides make it possible to mount the small mounting plates (FIG. 13) which are common to the profile section of FIG. 3 and to the profile section of FIG. 4. This has the consequence that only a single small plate reference item needs to be kept in stock (FIG. 13) and that a good clamping coupling is obtained since a good installation of the screw is made. The diameter of the inside hole of the profile section is provided in order to be tapped directly without additional drilling.

Figure 10:
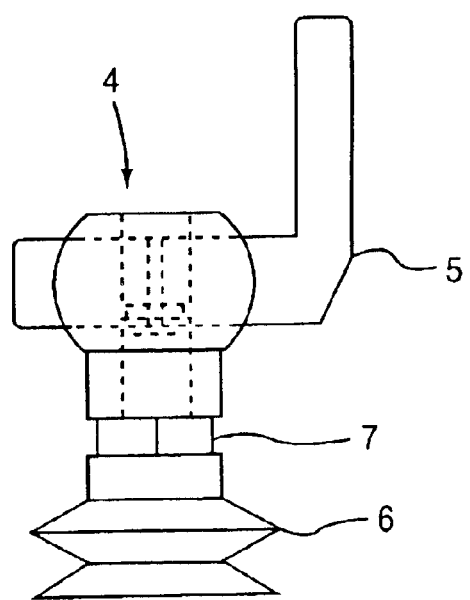
FIG. 10 shows a ball and socket bearing equipped with an air choke.

The different attachment pieces (connection piece of FIG. 5, angle bracket of FIG. 6, small plate of FIG. 13) make it possible for the profile section of FIG. 4 to attach at any position selected along the central core, comprised of the profile section of FIG. 2 or of the one from FIG. 3. The air choke is supported by a piece in the form of a ball joint (FIG. 8) that, once mounted in the ball and socket bearing (FIG. 7), gives the assembly an angular clearance of +22 degrees, thus making it possible to transport pieces with awkward shapes and to refine the adjustments at the last minute (FIG. 10).

Figure 21:
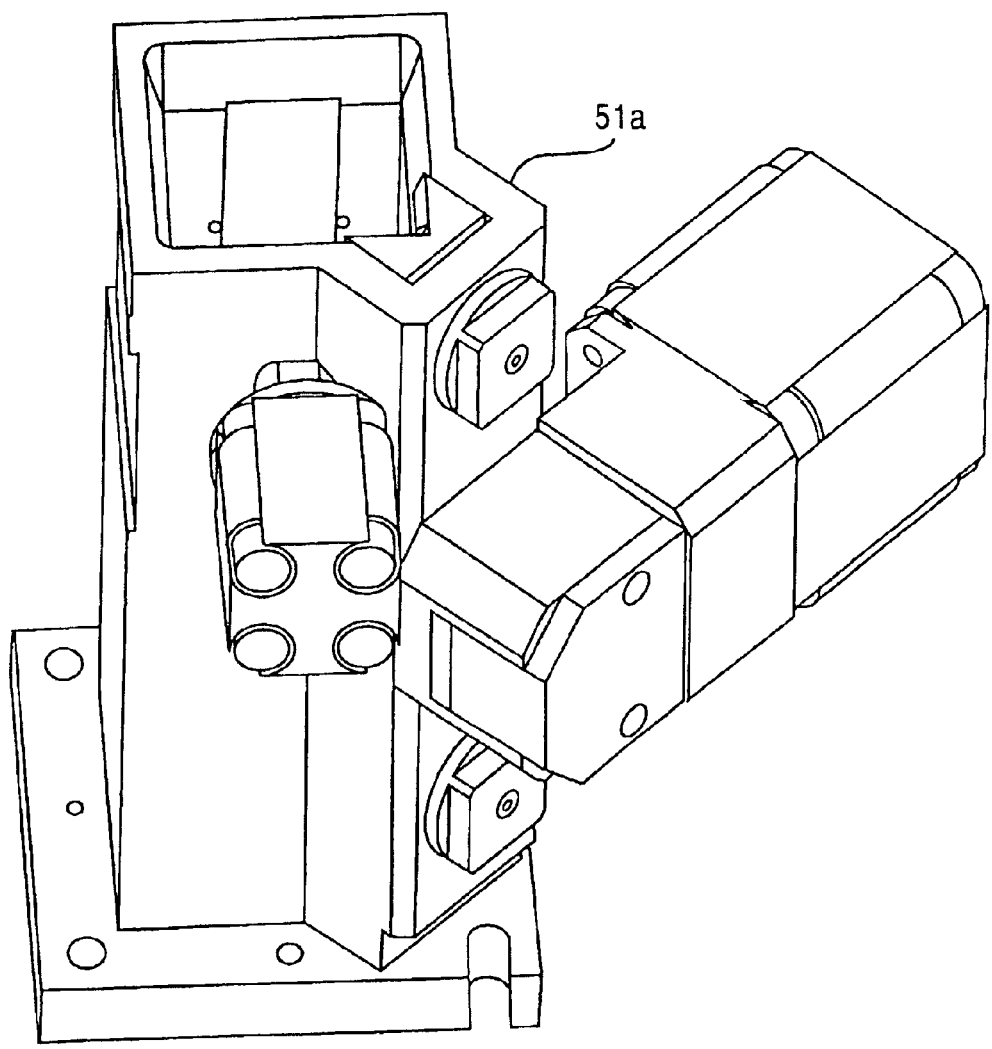
FIGS. 21 to 23 are perspective views of automatic interfaces between the modular gripper according to the invention and a robot or an automated system (not shown).

The extension pieces (FIG. 11) allow the air chokes to be able to suction by vacuum pieces whose shapes or differences height are sizeable. The automatic interface of FIG. 21 is provided for the section of FIG. 2, while the automatic interface of FIG. 22 is provided for the section of FIG. 3 and the automatic interface of FIG. 23 is provided for the section of FIG. 4.

The design of these interfaces makes possible an effective clamping of the modular gripper by irreversible cam clamping and thus a large amount of clamping rigidity. Moreover, it ensures a good repeatability of the mounting precision, because the clamping is done on the sections, enabling an interchangeability of the grippers in a few seconds.

Figure 24:
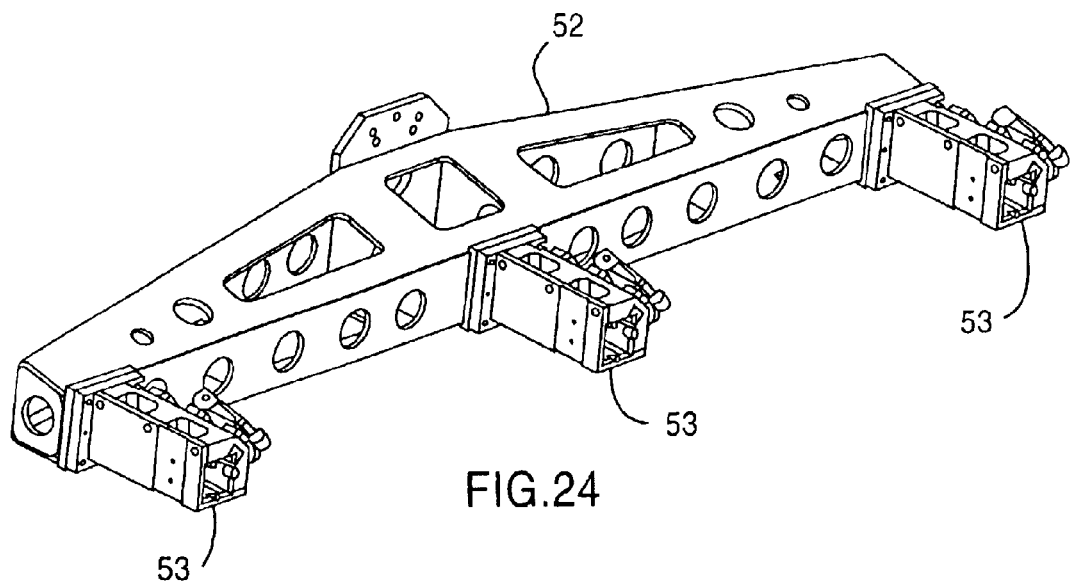
FIG. 24 is a perspective view of a crosspiece equipped with three interfaces with grippers according to the invention.

The modular gripper can be mounted on a crosspiece 52 (FIG. 24) that itself is mounted either onto a robot or onto a mechanized system. This crosspiece accommodates three interfaces 53 specified according to the requirements. This system makes it possible to mount a gripper in the center when small pieces are to be transported, or one to each end for pieces having large dimensions. The specifically designed shapes of the crosspiece allow it to be light while maintaining a good rigidity and while limiting vibrations.

Figure 26:
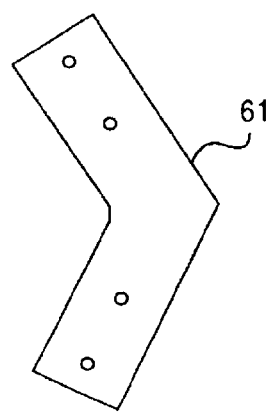
FIGS. 26 and 27 show plates for arms bent at an angle vertically.
Figure 27:
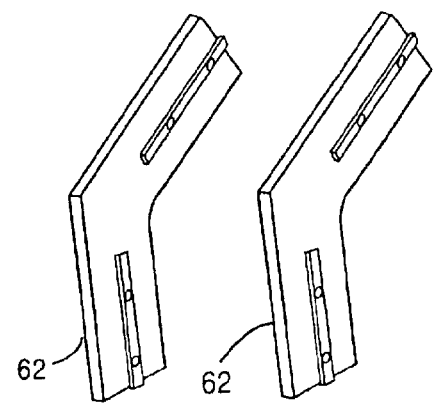
Figure 28:
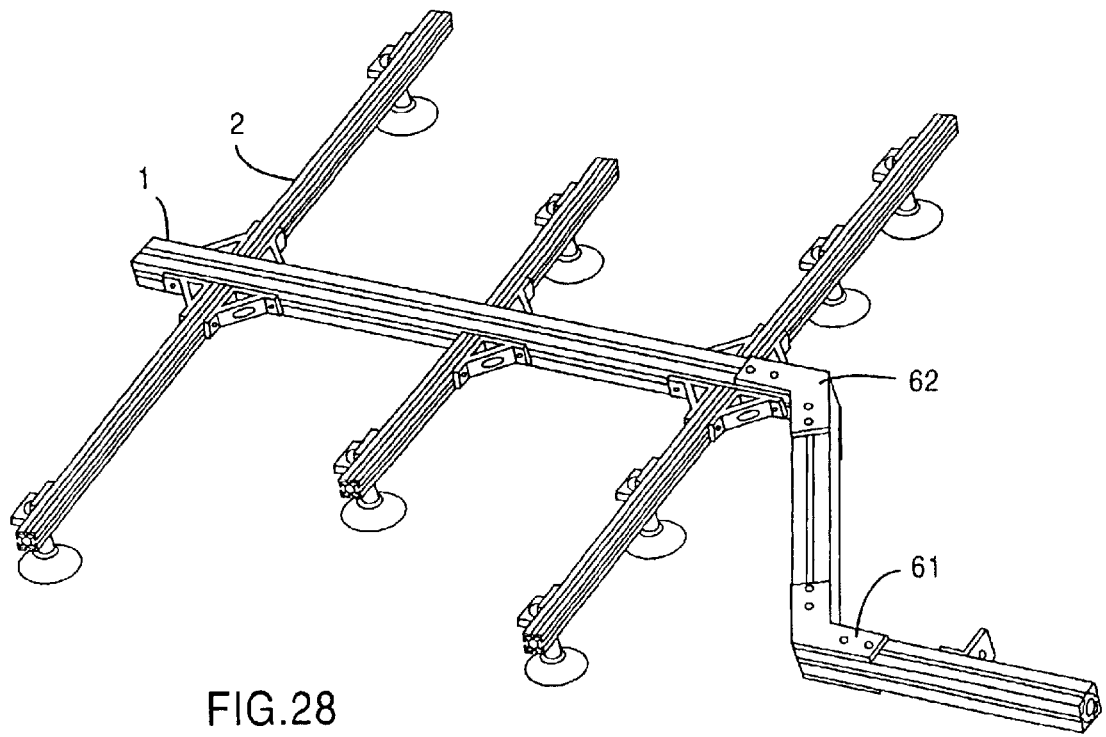
FIG. 28 is a perspective view in a reduced scale of a gripper equipped with plates of FIGS. 26 and 27.

FIGS. 26–27 show plates f61, 62 or arms bent horizontally that can equip a gripper (FIG. 28). They make it possible to split the central core of the gripper by 60 degrees. They are assembled in a pair: one in the groove of a profile section 4/6 and the other in that of 6/8.

Figure 29:
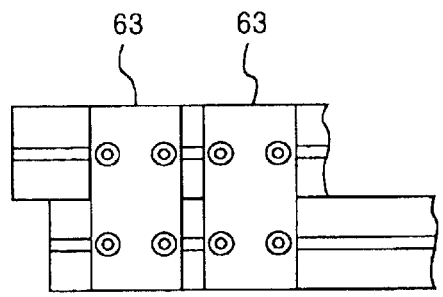
FIGS. 29 and 30 show plates for arms bent at an angle horizontally.
Figure 30:
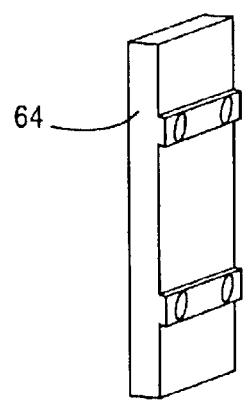
Figure 31:
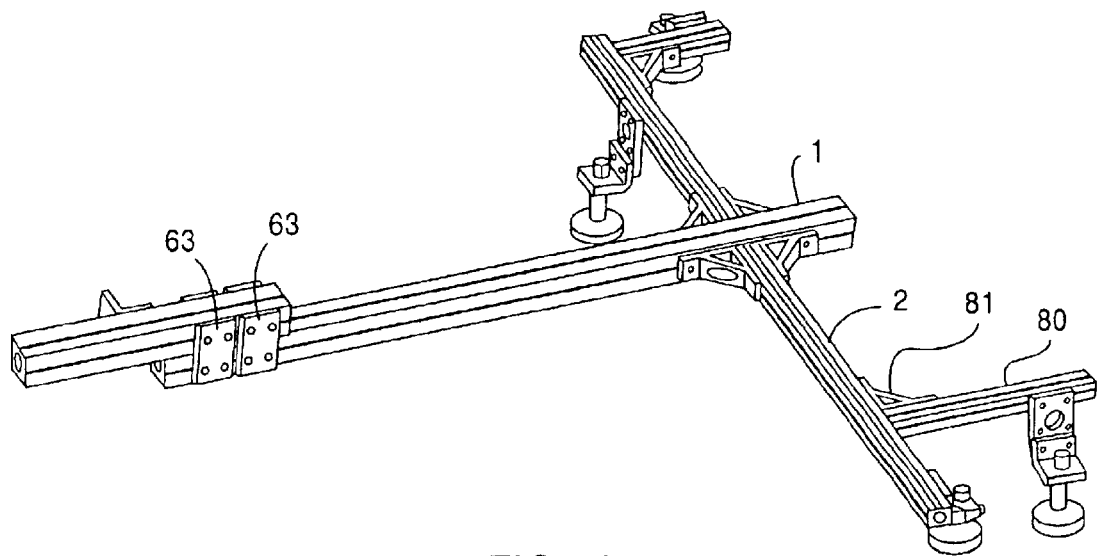
FIG. 31 is a perspective view in a reduced scale of a gripper equipped with plates of FIGS. 29 and 30.

FIGS. 29–30 show plates 63, 64 for arms bent vertically. These plates, according to their height, function to move the gripper of the piece to be transported in the direction of the height (FIG. 31). FIG. 31 also shows one air choke 6 mounted on a secondary profile section 80 affixed perpendicularly onto one of the profile sections 2 through mechanism 81.

What is claimed is:

1. Gripper provided with air chokes using vacuum suction, capable of transporting various material and objects, wherein said gripper consists of a modular structure, which comprises:

a central profile section core whose dimension is fitted to the size of the piece to be transported, profile sections fitted in order to be affixed perpendicularly onto this central core, with mechanisms for affixing these profile sections at selected locations, longitudinally extending supports mounted on ball and socket bearing supports by ball and socket bearings, said ball and socket bearing supports being mounted on the profile sections, and air chokes that are affixed to the ends of the longitudinally extending supports, so as to enable an angular clearance of the air chokes, wherein the profile of the central core comprises at least one groove for laterally clamping suction pipes for the air chokes.

2. Gripper according to claim 1, wherein the mechanisms for affixing the profile sections to the central core comprise, for each profile section, an angle bracket cooperating with a small plate slidable along a groove of the central core, so as to allow the profile sections to become clamped at any position on the central core.

3. Gripper according to claim 1, wherein at least one of the longitudinally extending supports is longitudinally adjustable, thus making it possible to transport pieces having awkward shapes.

4. Gripper according to claim 1, wherein at least two of the longitudinally extending supports have different lengths so as to serve as extension pieces.

5. Gripper according to claim 1, wherein the longitudinally extending supports each comprise a rod which is slidable into a piece with a shape of a ball which is mounted in the ball and socket bearing, and a spring is mounted between the rod and the piece with a shape of a ball.

6. Gripper according to claim 1, wherein the ball and socket bearing supports are attached onto the corresponding profile section so that they are slidably adjustable along the profile section.

7. Gripper according to claim 6, wherein each ball and socket bearing support cooperates with a respective small plate slidable along a groove of the corresponding profile section, so as to allow the ball and socket bearing supports to become clamped at any position on the profile sections.

8. Gripper according to claim 1, wherein said gripper comprises an extension piece to be affixed between at least one of the profile sections and the corresponding ball and socket bearing support, so as to enable the air chokes to suction by vacuum pieces whose shapes or differences in height are sizeable.

9. Gripper according to claim 1, wherein said gripper comprises sloped shims that make it possible to increase the angular clearance by a predetermined angle.

10. Gripper according to claim 9, wherein the sloped shims are affixed between profile sections and corresponding ball and socket bearing supports.

11. Gripper according to claim 1, wherein said gripper is fitted in order to be affixed onto a robot or on a mechanized system in order to allow an effective clamping of the gripper with a large amount of rigidity.

12. Gripper according to claim 1, wherein the central core comprises two opposed lateral grooves.

13. Gripper according to claim 1, wherein the profile sections have at least one longitudinal plane of symmetry, and comprise two opposed lateral grooves with openings oriented along this axis of symmetry.

14. Gripper according to claim 13, wherein the central profile section core also has at least one plane of symmetry, and comprises two opposed lateral grooves with openings oriented along this axis of symmetry.

15. Gripper according to claim 14, wherein the grooves on the profile sections and the grooves on the central core have cross-sections with same shapes and dimensions.

16. Gripper according to claim 1, wherein the profile sections have at least one longitudinal plane of symmetry and a lateral groove with an opening along this plane of symmetry, the groove having a maximum transverse width larger than a width of its opening, the ball and socket bearing support is in the shape of an angle bracket which extends away from the plane of symmetry of the profile section, such that (i) a ball joint on the ball and socket bearing is placed in a plane away from the plane of symmetry of the profile section, and (ii) a main central axis of the ball and socket bearing is oriented away from the plane of symmetry of the profile section.

17. Gripper according to claim 1, wherein the profile sections have at least one longitudinal plane of symmetry and a longitudinal groove with an opening along this plane of symmetry, the groove having a maximum transverse width larger than a width of its opening, the ball joint on the ball and socket bearing is oriented away from the plane of symmetry of the profile section, and the ball and socket bearing support is clamped to the profile section independently from the ball joint.

18. Gripper provided with air chokes using vacuum suction, capable of transporting various materials and objects, wherein said gripper consists of a modular structure, which comprises a central profile section core whose dimension is fitted to the size of the piece to be transported, and profile sections fitted in order to be affixed perpendicularly onto this central core, mechanisms for affixing these profile sections at the selected location, and air chokes that are affixed to the ends of the profile section by ball and socket bearings, so as to enable an angular clearance of the air chokes, wherein said gripper is mounted onto a crosspiece that is itself mounted either onto a robot or onto a mechanized system, and that accommodates three interfaces that make it possible to mount a gripper to a center interface for small pieces to be transported, or to end interfaces for pieces that have large dimensions.

19. Gripper provided with air chokes using vacuum suction, capable of transporting various materials and objects, wherein said gripper consists of a modular structure, which comprises a central profile section core whose dimension is fitted to the size of the piece to be transported, and profile sections fitted in order to be affixed perpendicularly onto this central core, mechanisms for affixing these profile sections at the selected location, air choke supports mounted on ball and socket bearing supports by ball and socket bearings, said ball and socket bearing supports being mounted on the profile sections, and air chokes that are affixed to the ends of the air choke supports, so as to enable an angular clearance of the air chokes, wherein the air choke supports each comprise a rod which is slidable into a piece with a shape of a ball which is mounted in the ball and socket bearing, and a spring is mounted between the rod and the piece with a shape of a ball.

20. Gripper provided with air chokes using vacuum suction, capable of transporting various materials and objects, wherein said gripper consists of a modular structure, which comprises a central profile section core whose dimension is fitted to the size of the piece to be transported, and profile sections fitted in order to be affixed perpendicularly onto this central core, mechanisms for affixing these profile sections at the selected location, air choke supports mounted on ball and socket bearing supports by ball and socket bearings, said ball and socket bearing supports being mounted on the profile sections, and air chokes that are affixed to the ends of the air choke supports, so as to enable an angular clearance of the air chokes, wherein said gripper comprises sloped shims that make it possible to increase the angular clearance by a predetermined angle.

21. Gripper provided with air chokes using vacuum suction, capable of transporting various material and objects, wherein said gripper consists of a modular structure, which comprises:
  a central profile section core having a cross-section that remains substantially the same over its length, whose dimension is fitted to the size of the piece to be transported,
  profile sections each having a cross-section that remains substantially the same over its length, said profile sections being fitted in order to be affixed perpendicularly onto this central core, with mechanisms for affixing these profile sections at selected locations,
  air choke supports mounted on ball and socket bearing supports by ball and socket bearings, said ball and socket bearing supports being mounted on the profile sections, and
  air chokes that are affixed to the ends of the air choke supports, so as to enable an angular clearance of the air chokes,
  wherein at least one of the supports is mounted on a secondary profile section having a cross-section that remains substantially the same over its length, said secondary profile sections being fitted in order to be affixed perpendicularly onto at least one of the profile sections, with mechanisms for affixing these profile sections at a selected location.

22. Gripper provided with air chokes using vacuum suction, capable of transporting various material and objects, wherein said gripper consists of a modular structure, which comprises:
  at least one profile section,
  air choke supports mounted on ball and socket bearing supports by ball and socket bearings, said ball and socket bearing supports being mounted on the profile sections, and
  air chokes that are affixed to the ends of the air choke supports, so as to enable an angular clearance of the air chokes,
  wherein the profile section has two longitudinal planes of symmetry substantially perpendicular to each other, and comprises two opposed lateral grooves having openings oriented along one of these planes of symmetry and two additional opposed lateral grooves having openings oriented along the other of these planes of symmetry, wherein each of the grooves has a maximum transverse width larger than a width of its opening,
  so as to enable affixing air choke supports with the grooves having openings along one of the two planes of symmetry and clamping air tubes to the grooves having openings along the other of the two planes of symmetry.

23. Gripper according to claim 22, which comprises at least one profile section core whose dimension is fitted to the size of the piece to be transported, and at least one profile section fitted in order to be affixed perpendicularly onto the profile section core, with mechanisms for affixing these profile sections at the selected location.

24. Gripper according to claim 22, wherein the profile section comprises a central pipe.

25. Gripper provided with air chokes using vacuum suction, capable of transporting various material and objects, wherein said gripper consists of a modular structure, which comprises:
- a central profile section core whose dimension is fitted to the size of the piece to be transported,
- profile sections fitted in order to be affixed perpendicularly onto this central core, with mechanisms for affixing these profile sections at selected locations,
- longitudinally extending supports mounted on ball and socket bearing supports by ball and socket bearings, said ball and socket bearing supports being mounted on the profile sections, and
- air chokes that are affixed to the ends of the longitudinally extending supports, so as to enable an angular clearance of the air chokes, wherein the profile sections each have two longitudinal planes of symmetry substantially perpendicular to each other and comprise two opposed lateral grooves having openings oriented along one of these planes of symmetry and two additional opposed lateral grooves having openings oriented along the other of these planes of symmetry, wherein each of the grooves has a maximum transverse width larger than a width of its opening,
- so as to enable affixing air choke supports to the grooves having openings along one of the two planes of symmetry and clamping air tubes to the grooves with openings along the other of the two planes of symmetry.

26. Gripper according to claim 25, wherein the central core also has two planes of symmetry substantially perpendicular to each other, and comprises two opposed lateral grooves having openings oriented along one of these planes of symmetry and two additional opposed lateral grooves having openings oriented along the other of these planes of symmetry, wherein each of the grooves has a maximum transverse width larger than a width of its opening.

27. Gripper according to claim 26, wherein the grooves on the profile sections and the grooves on the central core have cross-sections with identical shapes and dimensions.

28. Gripper provided with air chokes using vacuum suction, capable of transporting various material and objects, wherein said gripper consists of a modular structure, which comprises:
- at least one profile section having at least one longitudinal plane of symmetry and a longitudinal groove having an opening along this plane of symmetry, the groove having a maximum transverse width larger than a width of its opening,
- an air choke support mounted by a ball and socket bearing on a ball and socket bearing support, said ball and socket bearing support being mounted on the profile section, and
- an air choke that is affixed to the end of the air choke support, so as to enable an angular clearance of the air choke,
- wherein a main central axis of the ball and socket bearing is oriented away from the plane of symmetry of the profile section, and the ball and socket bearing support is clamped to the profile section independently from the ball joint,
- and wherein the profile section has two longitudinal planes of symmetry substantially perpendicular to each other, and comprises two opposed lateral grooves having openings oriented along one of these planes of symmetry and two additional opposed lateral grooves having openings oriented along the other of these planes of symmetry, wherein each of the grooves has a maximum transverse width larger than a width of its opening,
- so as to enable affixing air choke supports to the grooves having openings along one of the two planes of symmetry and clamping air tubes to the grooves having openings along the other of the two planes of symmetry.

* * * * *